(12) United States Patent
Schlipf et al.

(10) Patent No.: US 9,051,462 B2
(45) Date of Patent: Jun. 9, 2015

(54) POLYMER COMPOUND AND COMPONENTS PRODUCED USING THE COMPOUND

(75) Inventors: Michael Schlipf, Heidenheim (DE);
Claudia Stern, Tannhausen (DE);
Martin Maier, Ingersheim (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 13/199,683

(22) Filed: Sep. 7, 2011

(65) Prior Publication Data

US 2012/0061119 A1    Mar. 15, 2012

Related U.S. Application Data

(63) Continuation of application No. PCT/EP2010/053218, filed on Mar. 12, 2010.

(30) Foreign Application Priority Data

Mar. 18, 2009    (DE) .......................... 10 2009 014 974

(51) Int. Cl.
| | |
|---|---|
| *C08L 27/18* | (2006.01) |
| *C08L 71/00* | (2006.01) |
| *H01B 3/42* | (2006.01) |
| *H01B 3/44* | (2006.01) |

(52) U.S. Cl.
CPC .............. *C08L 27/18* (2013.01); *Y10T 428/139* (2015.01); *C08G 2650/40* (2013.01); *C08L 71/00* (2013.01); *H01B 3/427* (2013.01); *H01B 3/445* (2013.01)

(58) Field of Classification Search
CPC ............................. H01B 3/427; C08G 2650/40
USPC .................................... 524/542; 525/185, 151
See application file for complete search history.

(56) References Cited

U.S. PATENT DOCUMENTS

| | | | |
|---|---|---|---|
| 3,655,611 A | 4/1972 | Mueller et al. | |
| 3,759,883 A | 9/1973 | Mueller et al. | |
| 4,379,900 A | 4/1983 | Sulzbach ...................... | 526/247 |
| 4,592,782 A * | 6/1986 | Davies ........................... | 75/253 |
| 4,777,214 A * | 10/1988 | Petersen ....................... | 525/146 |
| 5,039,575 A | 8/1991 | Mori et al. ..................... | 428/463 |
| 5,364,682 A | 11/1994 | Tanaka et al. ................. | 428/138 |
| 5,686,176 A | 11/1997 | Adam et al. ................... | 428/327 |
| 5,823,540 A | 10/1998 | Grabau et al. ................ | 277/227 |
| 6,013,719 A * | 1/2000 | Lahijani ........................ | 524/508 |
| 6,258,413 B1 | 7/2001 | Woelki et al. ................. | 427/402 |
| 6,531,559 B1 * | 3/2003 | Smith et al. ................... | 526/255 |
| 6,774,196 B1 * | 8/2004 | Taira et al. .................... | 526/247 |
| 2001/0016625 A1 * | 8/2001 | Lahijani ........................ | 525/151 |
| 2006/0030681 A1 * | 2/2006 | Sawyer et al. ............... | 525/471 |
| 2008/0275162 A1 * | 11/2008 | Schwab et al. ............... | 523/201 |
| 2010/0181184 A1 | 7/2010 | Bahr ................................ | 203/2 |
| 2010/0290726 A1 * | 11/2010 | Schlipf et al. ................ | 384/297 |
| 2011/0040017 A1 | 2/2011 | Lehmann ..................... | 524/502 |
| 2011/0168288 A1 * | 7/2011 | Axelrad et al. ............... | 138/118 |

FOREIGN PATENT DOCUMENTS

| | | |
|---|---|---|
| CA | 1 322 747 | 10/1993 |
| DE | 1 940 304 | 2/1970 |
| DE | 2 325 562 | 12/1974 |
| DE | 30 21 369 | 12/1981 |
| DE | 37 36 292 | 5/1989 |
| DE | 39 12 716 | 10/1990 |
| DE | 44 30 474 | 3/1996 |
| DE | 196 19 232 | 11/1997 |
| DE | 698 31 675 | 6/2006 |
| DE | 10 2005 054 612 | 5/2007 |
| DE | 10 2007 038 929 | 2/2009 |
| DE | 10 2007 040 095 | 2/2009 |
| GB | 2 437 830 | 11/2007 |
| JP | 60079053 A * | 5/1985 |
| WO | WO 97/43102 | 11/1997 |
| WO | WO 01/60911 | 8/2001 |
| WO | WO 03/078481 | 9/2003 |
| WO | WO 2007/147271 | 12/2007 |
| WO | WO 2010/031844 | 3/2010 |

OTHER PUBLICATIONS

S. Ebnesajjad, Fluoroplastics, vol. 1, Non-Melt Processible Fluoroplastics, Verlag William Andrew Publishing, 2000.
Prof. Dr.-Ing. W.J. Bartz: Selbstschmierende und wartungsfreie Gleitlager, Ehningen bei Böblingen: Expert-Verl., 1993, pp. 288-299, 312-321 and 334.241.
Saechtling, Hansjürgen: Kunststoff-Taschenbuch, 25. Ausg., München, Wien: Carl Hanser Verlag, 1992, pp. 310-319 and 360-367.

* cited by examiner

Primary Examiner — Nicole M Buie-Hatcher (57) ABSTRACT

In order to provide polymer compounds which are improved with respect to their properties in comparison with conventional PTFE, on the one hand, and compounds thereof with additional high performance polymers, on the other hand, it is suggested that a polymer compound comprise a proportion of a fully fluorinated, thermoplastic polymer material as well as a proportion of at least one additional high performance polymer different thereto and selected from the group consisting of polyether ketone, polyether ether ketone and polyether aryl ketone as well as copolymers and derivatives of these polymers and copolymers, wherein the compound displays a homogeneous distribution of the proportions of the polymers and the polymer material.

13 Claims, 4 Drawing Sheets

POLYMER COMPOUND AND COMPONENTS PRODUCED USING THE COMPOUND

This application is a continuation of international application number PCT/EP2010/053218 filed on Mar. 12, 2010.

The present disclosure relates to the subject matter disclosed in international application number PCT/EP2010/053218 of Mar. 12, 2010 and German application number 10 2009 014 974.0 of Mar. 18, 2009, which are incorporated herein by reference in their entirety and for all purposes.

BACKGROUND OF THE INVENTION

The invention relates to a new type of polymer compound comprising a fully fluorinated thermoplastic material, in particular melt processible PTFE (m-PTFE) as well as a proportion of at least one additional high performance polymer which is different hereto and selected from the group of polyether ketone (PEK), polyether ether ketone (PEEK) and polyether aryl ketone (PEAK) as well as copolymers and derivatives of these polymers and copolymers, wherein the compound displays a homogeneous distribution of the proportions of the polymers.

The use of conventional PTFE in compounds with polyether ether ketones is known per se. Such compounds are produced by mixing the various polymers in powder form and, depending on the type of the main component, by subsequently pressure sintering or extruding them. If PTFE is the main component, the amount of polyether ether ketone is limited to a maximum of approximately 30% by weight. In the case where the main ingredient is polyether ether ketone, the amount of PTFE is limited to a maximum of 20% by weight.

In the first case, the mechanical properties, such as, e.g., the breaking stress and the breaking elongation, are noticeably worse with amounts of PEEK of above 20% by weight since the high proportion of PEEK which acts as a type of filler material in the PTFE matrix disrupts the cohesion of the PTFE matrix significantly.

In the second case, greater proportions of PTFE result first of all in the compound with the main ingredient of PEEK no longer being processible with the conventional methods of thermoplastic processing.

If the so-called hot compression molding process is used, somewhat greater amounts of PTFE up to approximately 30% by weight are possible. With even greater proportions of PTFE, the PEEK matrix will be significantly disrupted and the mechanical material properties drop drastically.

With these compounds, the fact that they cannot be obtained with a homogeneous melt structure is unsatisfactory. The improvements in the properties of the respective main components, which are aimed for by means of the compounding with the other polymer content, can, therefore, be achieved at the most to a small extent.

For these reasons, compounds with mixing ratios located therebetween are not available.

Typically, in the case of compounds with the main ingredient PEEK, the PTFE particles still remain as individually recognizable grains even after the thermoplastic processing with the methods described. The particles of the PTFE component do melt completely at the processing temperatures customary for PEEK of, typically, 370° C.±10° C. but there is no adequate mixing of the two polymer melts with the customary treatment times of, for example, 15 to 60 min on account of the high melt viscosity of the PTFE which is, typically, approximately $10^{10}$ to $10^{13}$ Pa×s at 380° C.

In the case of compounds with the main ingredient PTFE, the PEEK particles remain as individual particles even after undergoing the processing methods customary for PTFE although both components do melt at the sintering temperatures customary for PTFE of approximately 360 to 380° C. but no or only slight intermixing effects occur, on the one hand, on account of the high melt viscosity of the PTFE and, on the other hand, on account of the fact that no shearing forces act on the polymer melt during these processing methods typical for PTFE.

The object of the invention is to provide polymer compounds which are improved with respect to their properties compared to conventional PTFE, on the one hand, and compared to the additional high performance polymer or polymers, on the other hand.

SUMMARY OF THE INVENTION

This object is accomplished by a polymer compound according to the definition of claim 1.

The compound may be obtained with great homogeneity in the microstructure on account of the selection of the PTFE component as a fully halogenated, in particular fully fluorinated thermoplastic material.

This is shown, in particular, by the fact that in the case of the compounds according to the invention the individual components can no longer be identified as an original mixture of two powdery substances in the hardened end product following processing by the methods customary for thermoplastic materials, i.e., for example, by means of extrusion or injection molding methods.

In contrast to the compounds according to the invention, phases of the individual components may be recognized in conventional compounds as a result of special methods, e.g. coloring techniques in conjunction with a light microscope or using polarized light. Depending on the type of PTFE used, larger or smaller PTFE island structures remain in the compound, in the case of emulsion polymerized PTFE with typical dimensions of approximately 0.2 μm or more, in the case of suspension polymerized PTFE with typical dimensions of approximately 15 μm or more.

In comparison, the compound according to the invention is essentially free from PTFE island structures.

In the case of the compounds according to the invention, there is no restriction on the mixing ratios as specified above and the composition of the compound can be varied to a considerable degree with respect to the proportions of fully fluorinated thermoplastic material, in particular melt processible PTFE, as well as of the additional high performance polymer component or components.

The compounds according to the invention surprisingly display considerably improved mechanical properties in comparison with the conventional PTFE compounds and therefore open up a multitude of possibilities for use.

In particular, compounds according to the invention, which contain a high proportion of PEEK and a low proportion of thermoplastically processible PTFE, may be produced with a high breaking elongation, i.e. breaking elongation values of 20% and more, even more preferred 30% and more. The breaking elongation values specified correspond to values resulting from tests according to the standard EN ISO 527-1, using test samples of type V in accordance with ASTM D-638.

These properties are required, in particular, when, on the one hand, the typical spectrum of properties of the pure component PEEK, i.e. a high elastic modulus, a high resistance to deformation and a high breaking strength, are required but, on the other hand, the high brittleness of the PEEK prevents its successful use.

Applications with this requirement profile are, for example, seals with large dimensions in systems for oil extraction, including tanks, hoses or pipes of oil rigs or oil tankers or in general for the construction of chemical plants, in which seals consisting of the materials according to the invention must compensate for production tolerances of steel constructions to ensure a good seal and this requires a good adaptability. These plants are also subjected to considerable variations in temperature, force input and pressure during use with the dimensional changes resulting therefrom which makes a good flexibility of the sealing material necessary.

Compounds according to the invention, which have a high proportion of fully fluorinated, thermoplastically processible plastic material, in particular melt processible PTFE, may also be produced with low dielectric characteristic values, for example a relative dielectric constants ϵ of 2.1 and a dielectric loss factor $\tan \delta = 0.3 \times 10^{-3}$ or slightly more (both values calculated at 25 GHz).

PTFE materials, in particular standard PTFE, as well, originally have much higher breaking elongation values than PEEK. In this case, as well, however, a drastic drop in the breaking elongation values is observed with ever greater proportions of PEEK in the compound. The compounds according to the invention have, in comparison, considerably more favorable breaking elongation values, which are of great significance in a multitude of applications, with equal ratios of the amounts of fully fluorinated plastic material to additional high performance polymer.

They are particularly suitable for the production of components and structural elements for high frequency technology, i.e., for example, in cables, in particular coaxial cables, printed circuit boards and wiring boards or the antennae of distance radar systems in motor vehicles and trucks or in transmitting and receiving equipment for mobile radio and telecommunication. Components on the basis of the compounds according to the invention may also preferably be used for the construction of satellites for telecommunication, for global position finding or special observation tasks.

In addition, the compounds according to the invention are suitable for the production of components stable at high temperatures which display a favorable fire behavior. Such components are of great interest in aircraft construction, for example in the form of flexible electric cables.

When the compounds according to the invention are used for the production of cable insulations, their better electrical properties as well as their higher dielectric strength come into effect, in particular.

The compounds according to the invention are also outstandingly suitable for the production of injection molded parts, wherein the high mechanical strength of the components obtained vis-à-vis pressure and tensile loads are of particular advantage.

For the production of hoses, the higher mechanical strength values, the higher pressure resistance and the higher rupture pressure connected therewith as well as the higher pressure rigidity for long-term pressure loads not only at room temperature but also at temperatures up to 250° C. are of great importance.

Last but not least, foamed materials can be produced with the compounds according to the invention, in which a narrower distribution of pore sizes, lower densities and better insulation properties connected therewith, in particular in the case of cable insulations, as well, are possible. The specified cable insulations include, for example, the external insulation of a centrally positioned inner conductor or the insulating dielectric of a coaxial cable which is positioned concentrically between the inner conductor and the surrounding outer conductor.

In addition, the compounds according to the invention facilitate the production of additional materials with a high flexibility, for example films, such as those required, for example, for the production of flexible printed circuit boards. A Moldflon® film of a thickness of 50 μm typically has a bending fatigue strength of >1.2 million test cycles in accordance with the test procedure IPC-TM-650, 2.4.3. Strength values may be increased in accordance with the invention with the additional high performance polymer without the bending fatigue strength noticeably suffering. Apart from the use for flexible printed circuit boards, the compounds according to the invention are also well suited for the production of rigid-flex printed circuit boards.

Furthermore, the compounds according to the invention may be produced with improved sliding properties, wherein a stick-slip effect can be avoided, on the one hand, and, on the other hand, the coefficient of friction is very low, in particular for the compounds according to the invention with a high proportion of melt processible PTFE. In this case, coefficients of friction in the range of 0.1 to 0.3 are possible at a sliding velocity of V=0.6 m/sec and a load at right angles to the direction of slide of 0.5 to 1.5 N/mm².

One of the consequences of the low coefficients of friction is the low wear and tear values of the compounds according to the invention.

In addition, components consisting of the compounds according to the invention are also suitable for greater, specific surface pressures, display less wear and tear and, therefore, have a longer service life.

The advantages of the compounds according to the invention, as specified above, apply for the comparison of a fully fluorinated, thermoplastic polymer material, in particular with m-PTFE, with compounds with the same percentage composition, with which standard PTFE or a chemically modified, high molecular PTFE is used as fully fluorinated component.

The compounds according to the invention are preferably produced by way of melt compounding.

TFE copolymers, with which the comonomer content is less than 3.5 mol %, will be considered, in particular, as fully fluorinated thermoplastic materials since, in this case, the PTFE properties are retained to a great extent and, nevertheless, a thermoplastic processing is possible. The comonomer amount limited to less than approximately 3 mol % is also preferred, even more preferred are comonomer amounts of less than approximately 2.5 mol %, for example 1 mol % or less or 0.5 mol % or less.

Preferred comonomers which, on the one hand, ensure a good thermoplastic processibility and, on the other hand, leave the material properties vis-à-vis conventional PTFE more or less unchanged, are hexafluoropropylene, perfluoroalkyl vinyl ether, perfluoro-(2,2-dimethyl-1,3-dioxole) and trifluorochloroethylene.

Copolymers of TFE with trifluorochloroethylene are also subsumed under fully fluorinated plastic materials in conjunction with the present invention since the halogen proportion differing from fluorine is comparatively low.

Thermoplastically processible PTFE is preferably used, in particular, also melt processible PTFE or m-PTFE for short. A plurality of such materials is described, for example, in WO 01/60911 and WO 03/078481.

PFA also represents a suitable, fully fluorinated, thermoplastically processible plastic material within the meaning of the present invention.

Apart from the TFE copolymers, polymer blends of PTFE and one or more additional thermoplastically processible, fluorinated plastic materials are used as a fully halogenated, in particular fully fluorinated plastic material for use in accordance with the invention.

These additional, fully halogenated plastic materials are selected, in particular, from the group of PTFE micropowders. In this respect, these are types of PTFE with a low molecular weight and a low melt viscosity in comparison with high molecular (standard) PTFE. They are typically produced either by way of emulsion polymerization, by thermomechanical degradation of high molecular PTFE in an extruder or by radiation degradation of high molecular PTFE, followed by a milling process.

The differences in the properties of conventional or high molecular (standard) PTFE and low molecular PTFE micropowders may be represented, for example, as follows (cf. S. Ebnesajjad, Fluoroplastics, Vol. 1, Non-Melt Processible Fluoro-plastics, William Andrew Publishing, 2000):

| Product | Molecular Weight | Melt Viscosity at 380° C. in Pa × s |
|---|---|---|
| Standard PTFE | approx. $10^6$-approx. $10^8$ | approx. $10^{10}$-approx. $10^{13}$ |
| Micropowder | approx. $10^4$-approx. $10^6$ | approx. $10^2$-approx. $10^5$ |

Examples for such polymer blends are likewise found in the publications WO 01/60911 and WO 03/078481.

The proportion of the additional high performance polymers in the overall mass of the compound according to the invention is preferably 3% by weight or more. The improvement in properties is, in some cases, not especially pronounced below such a proportion.

On the other hand, the proportion of the fully fluorinated, thermoplastically processible polymer in the overall mass of the compound according to the invention should preferably be 1% by weight or more. This ensures that the improvements in the properties as a result of the full fluorinated plastic material are noticeable.

The property of the compound according to the invention of being well suited for processing on CNC machines is to be emphasized. This opens up a multitude of interesting fields of application for the compound according to the invention which were previously closed to the compound based on conventional PTFE.

Preferred compounds according to the invention can contain additives, in particular in quantities of up to 60% by weight in relation to the overall mass of the compound. Particularly preferred compounds according to the invention contain up to 40% by weight of additives.

Typical lower limits for additives are at approximately 0.5% by weight.

If colorants are contained in the compound as additives, the lower limit for this type of additive is typically at approximately 0.01% by weight. The upper limit for colorant proportions in the compound is typically at approximately 3% by weight.

Not only organic but also inorganic filler materials can be considered as additives.

The filler materials can be present, in particular, in a fiber form, granular or in needle form.

Functional filler materials, such as, for example, solid lubricants, such as, for example, $MoS_2$, PTFE, graphite and the like are particularly preferred. In this case, the advantage of the compound according to the invention that the improved mechanical properties of the compound are not noticeably impaired by proportions of filler material, when the proportions are kept within the limits described above, comes to good effect, particularly in the case of (standard) PTFE as filler material.

Plastic materials, which are non-dripping, in particular, in the case of fire and are superior to the conventional materials in their mechanical properties, may be achieved, for example, with (conventional) PTFE as filler material. These materials are particularly suitable as construction materials which are used in public buildings and institutions.

Additional, suitable reinforced filler materials are, for example, glass fibers and carbon fibers.

Carbon black is suitable as filler material, on the one hand, in order to provide a desired, electrical conductivity and, on the other hand, carbon black may also be used as a filler material which reduces sliding friction.

These and additional advantages of the invention will be explained in detail in the following on the basis of the examples and Figures.

DETAILED DESCRIPTION OF THE INVENTION

Examples

Comparative Example 1

A pipe with an external diameter of 10.9 mm and an internal diameter of 6.9 mm was produced by means of conventional extrusion from the plastic material Victrex® 450FE20 which is commercially available (80% by weight of PEEK and 20% by weight of PTFE).

The processing conditions of the plastic material are summarized in Table 1. A single-screw extruder equipped to be anticorrosive and having a screw diameter D of 30 mm and a screw length L of 25×D was used.

TABLE 1

| Parameter | Unit | Value |
|---|---|---|
| Extruder | | |
| Screw diameter | mm | 30 |
| L/D | — | 25 |
| Temperatures | | |
| C1 | ° C. | 360 |
| C2 | ° C. | 365 |
| C3 | ° C. | 360 |
| C4 | ° C. | 350 |
| Bridge | ° C. | 350 |
| Nozzle | ° C. | 345 |
| Screw speed | revs/min | 59 |

TABLE 1-continued

| Parameter | Unit | Value |
|---|---|---|
| Mass pressure | bar | 56 |
| Mass temperature | ° C. | 376 |
| Withdrawal speed | m/min | 1.6 |
| Nozzle type | | hose |
| DDR (draw down ratio) | — | 1.01 |
| DRB (draw ratio balance) | — | 0.99 |

Figure 3:
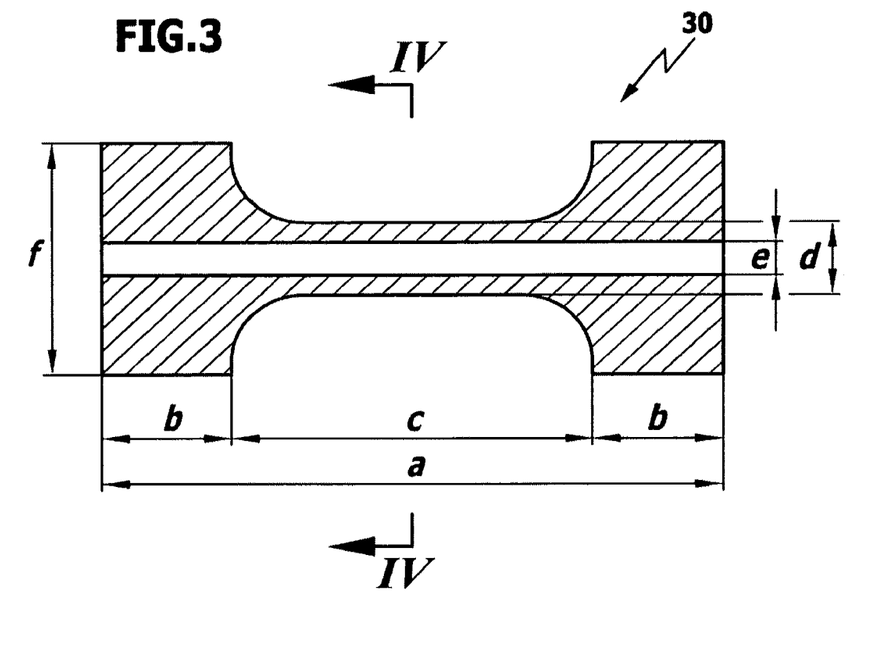
FIG. 3: shows a test piece (schematic) in accordance with ASTM D1710 in a longitudinal section.
Figure 4:
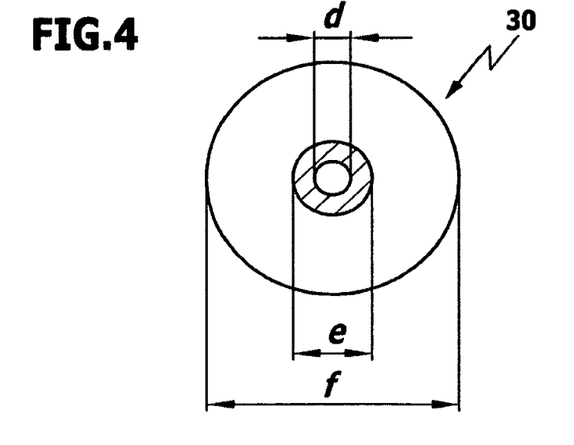
FIG. 4: shows a sectional view through the test piece along line IV-IV.

A test piece 30 was produced from the pipe by way of free-cutting machining, as illustrated schematically in FIGS. 3 and 4. The individual dimensions of the test piece 30 were as follows:

a=75 mm
b=25 mm
c=25 mm
d=6.9 mm
e=9 mm
f=10.9 mm

The test piece was subjected to examination not only with respect to the elastic modulus and the breaking stress but also the breaking elongation. The measured values are given in Table 2.

The test specimens were also subjected to tempering at 200° C. for 1 h and examined again with respect to the mechanical properties specified above. The measured values obtained are likewise included in Table 2.

The measured values were obtained during tensile strength tests on the basis of standard EN ISO 527-2.

Apart from the measured values, the associated standard deviations, which result from 5 measurements each, are also included in Table 2.

TABLE 2

| | Elastic Modulus [N/mm$^2$] | Breaking Stress [N/mm$^2$) | Breaking Elongation [%] |
|---|---|---|---|
| Comparative Example 1 | 3120 ± 300 | 68 ± 3 | 13 ± 2 |
| Comparative Example 1 (thermally treated) | 3160 ± 70 | 70 ± 2 | 8 ± 1 |
| Example 1 | 3630 ± 90 | 80 ± 3 | 49 ± 2 |
| Example 1 (thermally treated) | 3700 ± 160 | 88 ± 4 | 33 ± 5 |

Example 1

A compound according to the invention consisting of 80% by weight of PEEK and 20% by weight of m-PTFE of the type Moldflon® 10005 was produced in a thermoplastic mixing process in a twin-screw extruder equipped to be anticorrosive. The processing conditions used in this respect are summarized in Table 3.

The PEEK material used is available as Victrex® PEEK 450 G.

Moldflon® 10005 is an m-PTFE polymer modified with a comonomer content of 1.7% by weight of PPVE. The melt flow rate MFR (372/5) is 5 g/10 min.

TABLE 3

| Parameter | Unit | Value |
|---|---|---|
| Extruder | | |
| Screw diameter | mm | 25 |
| L/D | — | 42 |

TABLE 3-continued

| Parameter | Unit | Value |
|---|---|---|
| Temperatures | | |
| C1 | ° C. | 355 |
| C2 | ° C. | 365 |
| C3 | ° C. | 375 |
| C4 | ° C. | 385 |
| C5 | ° C. | 395 |
| Nozzle | ° C. | 360 |
| Screw speed | revs/min | 120 |
| Mass pressure | bar | 10 |
| Mass temperature | ° C. | 378 |

Pipes were produced from the compound thus obtained in accordance with the Comparative Example by means of conventional extrusion. The processing conditions were given in Table 1.

Test specimens 30 were produced from the pipes analogously to Comparative Example 1. The measured values obtained by means of tensile strength tests are summarized in Table 2 together with the associated standard deviations, obtained from 5 measurements.

The comparison of the measured values obtained for the samples (cf. Table 2) results in the superior mechanical properties of the compounds according to the invention or of the test specimens 30 produced therefrom. A breaking elongation, which is 5 times higher than that of the comparative samples, is obtained, in particular.

The samples according to the invention are free from pores in contrast to those consisting of conventional compounds (cf. images of FIGS. 1 and 2) on account of the excellent melt processibility of the compounds according to the invention.

Figure 1:
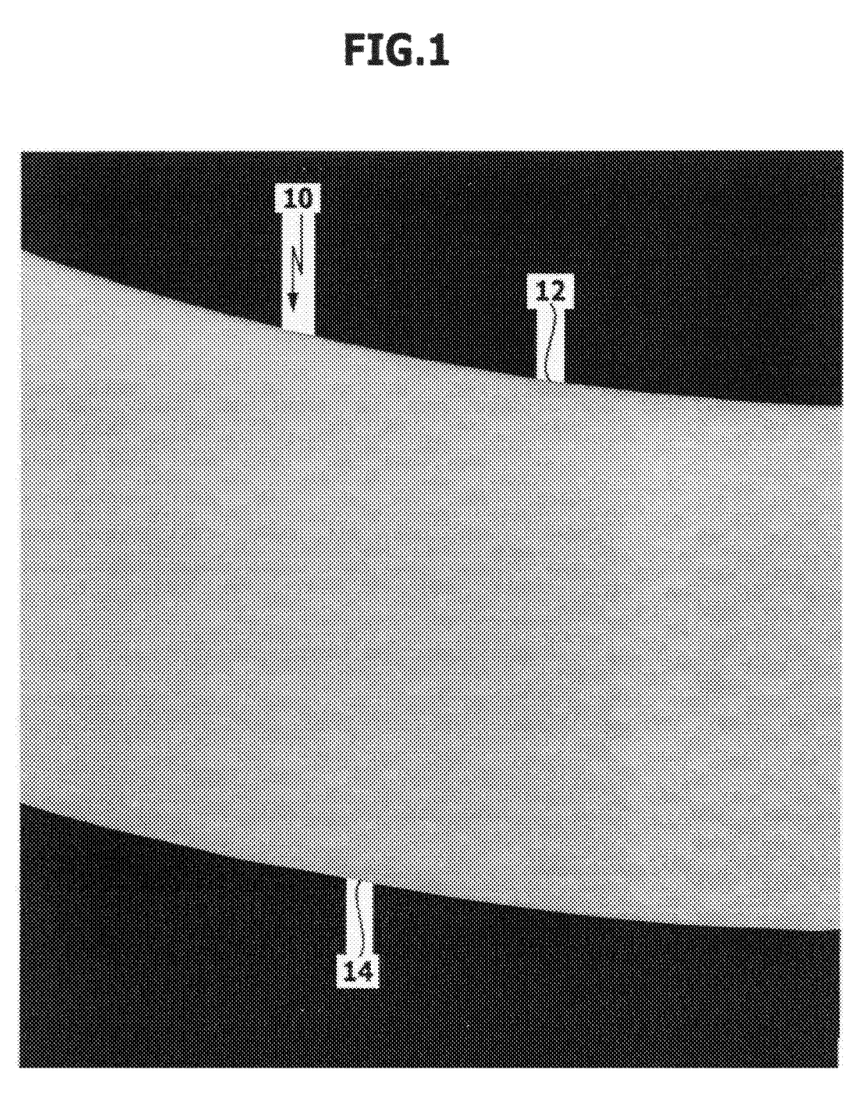
FIG. 1: shows a photomicrograph of a component produced from a compound according to the invention.
Figure 2:
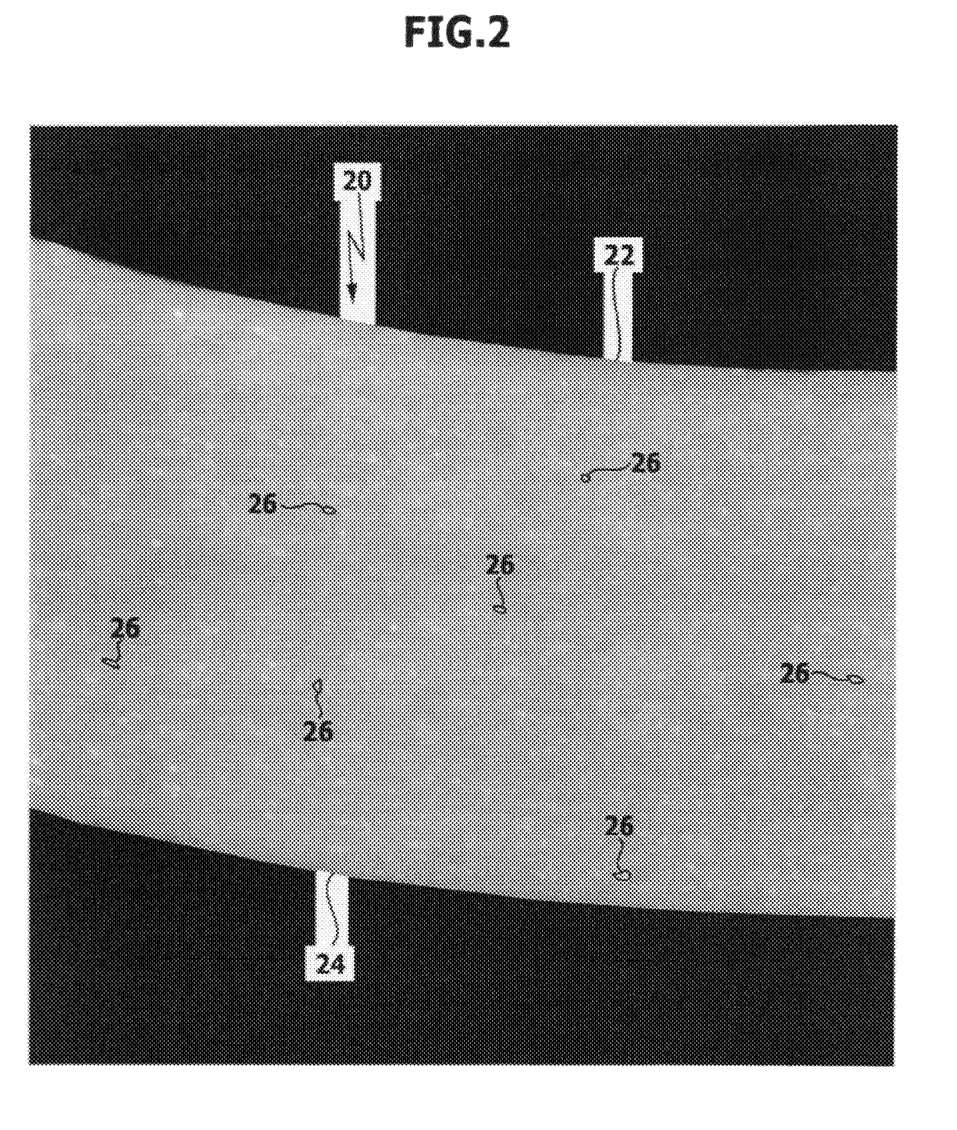
FIG. 2: shows a photomicrograph of a component produced from a conventional compound.

The improved homogeneity in the distribution of the two polymer materials of the compounds in the samples according to the invention is apparent from a comparison of the images of FIGS. 1 and 2.

FIG. 1 shows a section from a photomicrograph of the cylinder wall 10 of the pipe obtained in accordance with Example 1 which displays a completely homogeneous distribution of the two polymer components PEEK and m-PTFE over the entire wall thickness from the inner surface 12 to the outer surface 14. The radial distance from the inner surface 12 to the outer surface 14 is 900 μm.

In contrast thereto, the PTFE contents are clearly visible in FIG. 2, in which a section of the cylinder wall 20 of the pipe from Comparative Example 1 is illustrated in a photomicrograph, as a type of island structure. The PTFE contents of the island structure are, by way of example, depicted as areas 26 in FIG. 2. The radial distance from the inner surface 22 to the outer surface 24 is 900 μm.

Examples 2 to 4

Polymer compounds according to the invention and consisting of PEEK and m-PTFE with different mixing ratios were, as explained in Example 1, produced in the twin-screw extruder by means of thermoplastic mixing. The processing conditions can be taken from Table 3.

Test plates in disc form with a diameter of 60 mm and a thickness of 1.5 mm were produced from the compounds in the conventional melt compression molding process at a temperature of 360° C. with mixing ratios of 20% by weight of PEEK and 80% by weight of Moldflon® 10005 (Example 2) as well as 40% by weight of PEEK and 60% by weight of Moldflon® 10005 (Example 3) and 80% by weight of PEEK and 20% by weight of Moldflon® 10005 (Example 4). The type Victrex® 450 G was used as PEEK material.

Figure 5:
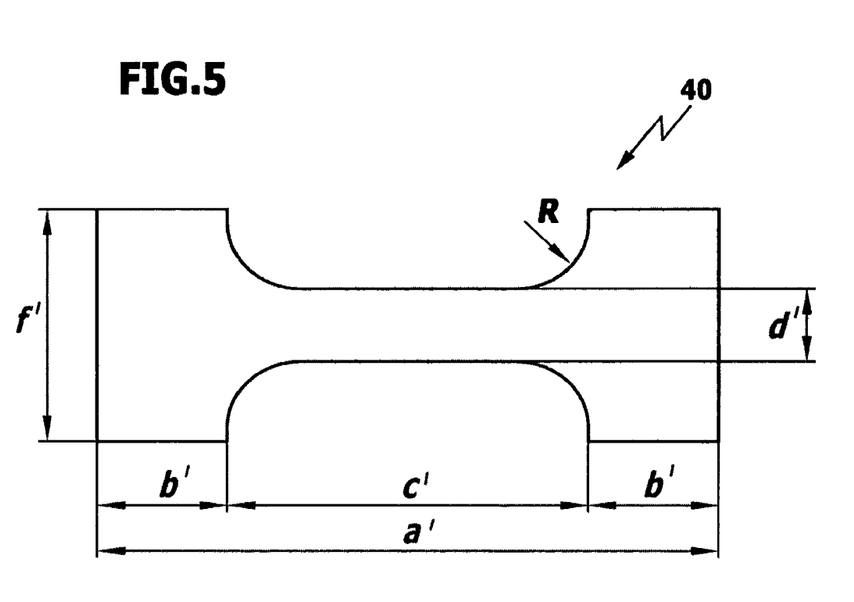
FIG. 5: shows a plan view of a test piece in accordance with SPI standard FD-105.

FD-105 test pieces 40 in accordance with standard EN ISO 12086 were stamped from the test plates (cf. FIG. 5) and the mechanical characteristics elastic modulus, breaking stress and breaking elongation were tested in accordance with standard EN ISO 527-2. The measured values obtained are specified in Table 4. The dimensions of the test piece 40 of FIG. 5 were as follows:

a'=38 mm
b'=8 mm
c'=22 mm
e'=5 mm
f'=15 mm
Radius R=5 mm
Thickness of the test piece=1.5 mm

TABLE 4

| Example | Weight Ratio in the Compound PEEK:m-PTFE | Elastic Modulus [N/mm$^2$] | Breaking Stress [N/mm$^2$] | Breaking Elongation [%] |
| --- | --- | --- | --- | --- |
| 2 | 20:80 | 900 ± 100 | 14 ± 2 | 200 ± 5 |
| 3 | 40:60 | 1760 ± 120 | 41 ± 5 | 52 ± 6 |
| 4 | 80:20 | 3260 ± 200 | 70 ± 3 | 46 ± 5 |

In Example 4, slight deviations in the measured values in comparison with Example 1 result on account of the different production process for the test pieces as well as the different test piece geometry. In particular, an orientation of the polymer molecules in the melt is lacking in the production process of Examples 2 to 4.

Comparative Examples 2 and 3

Whereas, in Examples 2 to 4, the test specimens have been stamped from test plates which had been produced in a melt compression process, the test specimens in the Comparative Examples 2 and 3 were produced by stamping them out of a skived film of the thickness 1.5 mm which was produced by way of slicing from a cylindrical body with an internal diameter of 40 mm and an external diameter of 75 mm. A test piece 40 according to FIG. 5 was used in this case, as well (FD-105 according to standard EN ISO 12086).

The cylindrical body was produced by pressing the mixture of polymer particles at 300 bars and sintering in a circulating air oven at 362° C. for 3 days.

The standard PTFE type used was Dyneon TF 1750, the PEEK type Victrex 150 XF. The compounds were produced in a GLASS vacuum all-round high-speed mixer VAS 600 with a mixing time of 6 min.

TABLE 5

| Comparative Examples | Weight Ratio in the Compound Standard PTFE:PEEK | Elastic Modulus [N/mm$^2$] | Breaking Stress [N/mm$^2$] | Breaking Elongation [%] |
| --- | --- | --- | --- | --- |
| 2 | 80:20 | 850 ± 250 | 17 ± 3 | 250 ± 50 |
| 3 | 70:30 | 950 ± 250 | 15 ± 3 | 9 ± 3 |

Table 5 shows the values for the elastic modulus, breaking stress and breaking elongation in accordance with standard EN ISO 527-1 for the materials of the Comparative Examples 2 and 3.

The invention claimed is:

1. Polymer compound, comprising a proportion of a fully fluorinated thermoplastically processible polymer material as well as a proportion of at least one additional high performance polymer different thereto and selected from the group consisting of polyether ketone, polyether ether ketone and polyether aryl ketone as well as copolymers and derivatives of said polymers and copolymers, wherein the compound displays a homogeneous distribution of the proportions of the at least one additional high performance polymer and the polymer material, said fully fluorinated thermoplastically processible polymer material comprises approximately 50% by weight or more of melt processible PTFE in the form of a TFE copolymer with a single comonomer, the content of which amounting to less than 3.5 mol %, and wherein the breaking elongation of the compound is approximately 20% or more when tested as sample type V in accordance with ASTM D-638, wherein said homogeneous distribution is such that the individual Polymer components of said at least one additional high performance polymer and said polymer material are no longer recognizable by way of coloring techniques in conjunction with a light microscope or using polarized light.

2. Compound as defined in claim 1, wherein the comonomer is selected from hexafluoropropylene, perfluoroalkyl vinyl ether, perfluoro-(2,2-dimethyl-1,3-dioxole) and trifluorochloroethylene.

3. Compound as defined in claim 1, wherein the compound is produced by way of melt compounding.

4. Compound as defined in claim 1, wherein the ratio of the proportions of fully fluorinated thermoplastic material to the proportions of the at least one additional high performance polymer is approximately 20:80 to approximately 70:30.

5. Compound as defined in claim 4, wherein the breaking elongation is 30% or more.

6. Compound as defined in claim 4, wherein the ratio of the proportions of the fully fluorinated thermoplastic material to the proportions of the at least one additional high performance polymer comprising PEEK is approximately 20:80 to approximately 70:30.

7. Compound as defined in claim 1, wherein the compound is essentially pore free.

8. Compound as defined in claim 1, wherein the compound comprises additives, in particular with amounts of up to approximately 60% by weight of the overall weight of the compound.

9. Compound as defined in claim 8, wherein one or more filler materials are included as additives.

10. Compound as defined in claim 9, wherein the filler material or materials are selected from PTFE, carbon fibers, glass fibers, carbon black and graphite.

11. Polymer compound, comprising a proportion of a fully fluorinated thermoplastically processible polymer material as well as a proportion of at least one additional high performance polymer different thereto and selected from the group consisting of polyether ketone, polyether ether ketone and polyether aryl ketone as well as copolymers and derivatives of said polymers and copolymers, wherein the compound after melt compounding displays a homogeneous distribution of the proportions of the at least one additional high performance polymer and the polymer material, said fully fluorinated thermoplastically processible polymer material comprises melt processible PTFE in the form of a TFE copolymer with a single comonomer, the content of which amounting to less than 3.5 mol %, wherein the homogeneous distribution is such that the individual polymer components of said at least one additional high performance polymer and said polymer material are no longer recognizable by way of coloring techniques in conjunction with a light microscope or using polarized light.

12. Compound as defined in claim 11 which is free of PTFE phases recognizable by way of coloring techniques in conjunction with a light microscope or using polarized light.

13. Polymer compound, comprising a proportion of a fully fluorinated thermoplastically processible polymer material as well as a proportion of at least one additional high performance polymer different thereto and selected from the group consisting of polyether ketone, polyether ether ketone and polyether aryl ketone as well as copolymers and derivatives of said polymers and copolymers, wherein the compound displays a homogeneous distribution of the proportions of the at least one additional high performance polymer and the polymer material, said fully fluorinated thermoplastically processible polymer material comprises melt processible PTFE in the form of a TFE copolymer with a single corrionomer, the content of which amounting to less than 3.5 mol %, and wherein the breaking elongation of the compound is approximately 20% or more when tested as sample type V in accordance with ASTM D-638, wherein said homogeneous distribution is such that the individual polymer components of said at least one additional high performance polymer and said polymer material are no longer recognizable by way of coloring techniques in conjunction with a light microscope or using polarized light and wherein the compound is free of PTFE phases recognizable by way of coloring techniques in conjunction with a light microscope or using polarized light.

* * * * *